US005079784A

United States Patent [19]

Rist et al.

[11] Patent Number: 5,079,784

[45] Date of Patent: Jan. 14, 1992

[54] HYDRO-MASSAGE TUB CONTROL SYSTEM

[75] Inventors: Bruno A. Rist, Woodland Hills, Calif.; Charles S. Daniels, Las Vegas, Nev.

[73] Assignee: Hydr-O-Dynamic Systems, Inc., Las Vegas, Nev.

[21] Appl. No.: 306,830

[22] Filed: Feb. 3, 1989

[51] Int. Cl.$^{5}$ .......................... A61H 33/02; F24H 1/10; G01D 5/34; F04B 49/00

[52] U.S. Cl. .......................... 4/542.0; 4/544.0; 73/293.0; 73/301.0; 219/492.0; 219/494.0; 219/506.0; 250/231.019; 340/619.0; 417/38.0

[58] Field of Search .......................... 4/541-545; 417/36, 38, 44; 340/612, 618, 619, 638-640; 73/293, 299, 301; 338/32 H; 219/494, 506, 492, 306, 907, 328; 337/242, 266; 250/231.19

[56] References Cited

U.S. PATENT DOCUMENTS

| | | | |
|---|---|---|---|
| 4,025,888 | 5/1977 | Judd et al. | 337/266 |
| 4,061,988 | 12/1977 | Lewandowski | 338/32 H |
| 4,169,293 | 10/1979 | Weaver | 4/544 |
| 4,233,694 | 11/1980 | Janosko et al. | 4/544 |
| 4,260,862 | 4/1981 | Orcutt | 200/83 P X |
| 4,289,963 | 9/1981 | Everett | 250/231.19 |
| 4,337,388 | 6/1982 | July | 219/494 |
| 4,398,284 | 8/1983 | Pryor | 350/96.1 |
| 4,464,936 | 8/1984 | McIntire et al. | 250/231.19 X |
| 4,564,962 | 11/1986 | Castleberry et al. | 4/543 |
| 4,604,633 | 8/1986 | Kimura et al. | 340/619 |
| 4,763,365 | 8/1988 | Gerondale et al. | 4/542 |
| 4,780,917 | 11/1988 | Hancock | 4/544 |
| 4,797,958 | 1/1989 | Guzzini | 4/542 |

OTHER PUBLICATIONS

Spa and Sauna, Dec. 1987, pp. 1, 29, 54 and 66.

*Primary Examiner*—Henry J. Recla
*Assistant Examiner*—Robert M. Fetsuga
*Attorney, Agent, or Firm*—David O'Reilly

[57] ABSTRACT

A control system for hydro-massage tub systems in which water is circulated through a pump and heater from the tub back to a plurality of jets in the tub to create a turbulent massaging action. The system is comprised of an activating device, a pump, a switch activating circuit, a heater with proportional control and a water level sensing safety system. The pump is controlled by a switching and timing circuit that limits the time the pump is on which is slaved to a heater control circuit to prevent operation of the heater unless the pump is circulating water. The proportional heater control circuit maintains the water temperature within a degree or two of a preset temperature by proportionally reducing power as the temperature approaches the preset limit. The activating device transmits a ignal to the switching and timer circuit when a mechanical plunger isolated from electrical circuits is operated. The level sensing device monitors the water level in the tub and interrupts or prevents operation of the switching and timing circuit unless water is at a level which activates the level sensing signal transmission circuit.

19 Claims, 6 Drawing Sheets

HYDRO-MASSAGE TUB CONTROL SYSTEM

FIELD OF THE INVENTION

This invention relates to hydro-massage or whirlpool bathtubs, and more particularly relates to a control system for such bathtubs, spas and the like.

BACKGROUND OF THE INVENTION

Hydro-massage bathtubs provide a therapeutic massaging action by delivering water through a plurality of jets in the tub wall to create a circulating flow of turbulent water. The tub water is circulated through a heater and pump back to the tub through the jets to provide a warm circulating flow. Air can be added to the circulated flow at a controlled rate to increase the turbulence and massaging action of the water exiting from the jets.

As with any such system having electricity in proximity to water, all electrical components must be isolated from the user to prevent injuries due to electrical shock. To prevent accidents, extraordinary efforts are made to provide electrical components and wiring, which are completely isolated by using mechanical controls linked to electrical circuits. However, these devices, though effective, are not as stable, efficient and reliable as desired.

An additional problem with these types of control systems is that of inadvertent operation when the the water level is low. Such occurrences can result in the jets splattering water throughout the area resulting in a damaging, messy and unsanitary condition, or the pump running dry and burning out the shaft seals.

Some systems employ level sensors to make a system inoperable if levels are below a pre-selected level, however, they suffer from a number of problems. One such system uses a float which can bind, thereby preventing operation. Further, such floats being in contact with dirty trashy water can interfere with the system operation requiring frequent maintenance. Other systems use pistons which can freeze or stick, thereby interfering or preventing operation. A system that uses no hinged parts, pistons or floats would be advantageous as it could be isolated from the water used in the system resulting in improved stability, reliability and efficiency.

These systems also suffer from frequent electrical failure, due to the corrosive environment created when there is a high degree of moisture present. System components often corrode and fail and require replacement or repair.

It is therefore one object of the present invention to provide a hydro-massage bathtub control system having a reliable, stable and safe design by using all solid-state construction.

Still another object of the present invention is to provide a hydro-massage tub control system having improved electrical controls.

Yet another object of the present invention is to provide a hydro-massage tub system having an operating switch system minimizing the potential for failure by using an electrically isolated switch for safety.

Another object of the present invention is to provide a hydro-massage tub control system having a water level sensor safety system which will prevent operation below a pre-selected water level.

Still another object of the present invention is to provide a hydro-massage tub control system having an improved heater design using all solid-state circuits.

Yet another object of the present invention is to provide a heater system for a hydro-massage tub, providing proportional control to the heater for improved efficiency, stability and temperature regulation.

Yet another object of the present invention is to provide a hydro-massage tub system with a heater system having a fail-safe thermal fuse and fail indicator.

Another object of the present invention is to provide a hydro-massage control system having a heater control minimizing overheating to provide more accurate operation. The proportional control of power to the heating system provides very little potential overshoot and maintains temperature at a very reliable pre-selected level.

Still another object of the present invention is to provide a hydro-massage tub control system having a modular construction, connected by modular cords and plugs, allowing quick disconnect and replacement or repair of solid state circuits.

Another object of the present invention is to provide a water level sensing safety system for a hydro-massage tub having a positive acting optical switch isolated from the water in the tub by an air column.

Still another object of the present invention is to provide a water level sensor safety system for a hydro-massage control system having a positive acting switch isolated from tub water, that operates almost instantaneously to stop the system when the water drops below a pre-selected level.

Another object of the present invention is to provide a water level sensing safety system that avoids the use of unreliable mechanical or hinged parts.

BRIEF DESCRIPTION OF THE INVENTION

The purpose of the present invention is to provide a hydro-massage bathtub control system that has an improved all solid-state construction and features which improve accuracy, reliability and safety.

The hydro-massage bathtub control system according to the invention has an all solid-state control for the system pump, a magnetically operated on and off switch signalling device that isolates electrical components and wiring from the user, an improved solid-state proportional heater control system, and a water level sensing safety system having improved safety and reliability. The pump control circuit is an all solid-state system including a solid-state timer to set the length of time for operation of the pump. After the period of time set by the timer, the pump will cycle off preventing continuous unattended operation of the system.

A magnetically operated solid-state Hall effect switch transmits a signal to start the cycle time by activating the pump, circulating water to a plurality of jets in the tub causing a turbulent massaging action. Air vents on the tub rim allow air to be added at a controlled rate and circulated to the jets to increase the turbulence and provide a flow of stimulating bubbles. When the magnetic Hall effect signalling device switch is activated the pump draws water from the tub through a heater and recirculates it to the plurality of jets in the tub.

The water in the tub is heated as it is drawn from the tub by the pump through an in-line element controlled by a solid-state circuit providing proportional temperature control. The solid-state heater control has adjustments to preset the temperature range and the maximum temperature of the water. The proportional temperature control activates the heater and then proportionally reduces power as the temperature of the water approaches the pre-selected maximum. This proportional control improves temperature accuracy and effectively prevents overshoot. This is a substantial improvement over the typical on-off heater control systems which gives either full power or no power when they are on or off.

The proportional control system of the present invention reduces power levels to the heater to maintain the temperature within an adjustable range of ±2° F., preferably within 1° F., or better. As the temperature falls below the set point temperature proportional power is applied to the heater to reheat the water until it approaches the set point. Power is proportionally reduced as the temperature approaches the set point temperature so that overshoot, or temperature "inertia", is substantially eliminated preventing any substantial overheating of the tub water being circulated through the heater and pump.

The system also includes an improved water level sensing safety system that effectively prevents operation unless water is at a predetermined level. The water level sensing safety system is a completely closed tubular container forming an air column with an inlet positioned in the tub at a level above the water jets. This construction prevents contaminating water, soap or trash from reaching the controls. If the water level is not at the level of the inlet, the system cannot operate. When the level is above the inlet, water enters the closed water level sensing safety system applying pressure to an air column which activates a switch sending a signal to allow the system to operate.

Preferably the signalling system is an electro-optical device comprised of a light emitting diode and a photo detector, or photocell. A diaphragm at the upper end of the air column of the closed container has a flag, or barrier, which occludes the path of the light emitting diode interrupting the beam when the diaphragm is expanded thereby allowing the system to operate. When the water level falls below the inlet of the level sensing system, the barrier is retracted allowing the light beam to impinge on the photo cell, sending a "hard" reset to keep the system switching circuit off. Thus, the water level sensing safety system is substantially fail-safe.

The diaphragm in the closed water level sensing safety system isolates the electrical components preventing any moisture from contaminating or interfering with their operation. Additionally, the diaphragm is specially constructed to have a central thin membrane portion which causes positive operation with hysterisis when the pressure in the air column is above or below a pre-determined amount. As water enters the inlet causing an increase in pressure in the air column the diaphragm bulges until the conically shaped central membrane snaps up, providing a positive quick acting extension of the flag or barrier into the path of the light beam. Conversly, when the water level drops below the inlet and the pressure in the air column drops below a pre-determined amount, the thin center membrane of the diaphragm snaps back retracting the barrier allowing the light beam to impinge on the photo cell, thereby generating a reset signal.

The functions of the systems are all interconnected using modular plugs and signal transmitting cords to provide a modular system in which any part of the system may be easily removed for repair or replacement. A control box containing the heater, pump control and switching circuits is mounted on top of the motor and provides power to the heater and pump. Grounded sockets are provided in the control box for receiving power cord plugs from the heater and the pump. Additionally, indicator lights on the control box provide diagnostic information on the operation of the system. A green light emitting diode indicates system power is on, and red light emitting diode indicating improper electrical installation, a yellow light emitting diode on the control box indicates heater duty cycle on time. The yellow indicating light emitting diode will cycle on and off indicating the proportional power being applied to the heater element. The on cycle shortens as the preset temperature is approached, indicating the proportional reduction in power. When the temperature of the water drops, the heater will be energized and increased power proportional to the temperature decrease is applied until the temperature is brought back up to the set point temperature. A proportional reduction in power as the temperature approaches the set point temperature, reduces the amount of temperature overshoot and increases the efficiency of operation and maintenance of the temperature at the operating level.

The above and other objects and features of this invention will be more fully understood from the following detailed description and the accompanying drawings, in which:

BRIEF DESCRIPTION OF THE DRAWINGS

FIG. 5(*a*) is a sectional view taken at 5*a*—5*a* of FIG. 5;

FIG. 5(*b*) is a perspective view of a diaphragm for use in the invention;

DETAILED DESCRIPTION OF THE INVENTION

Figure 1:
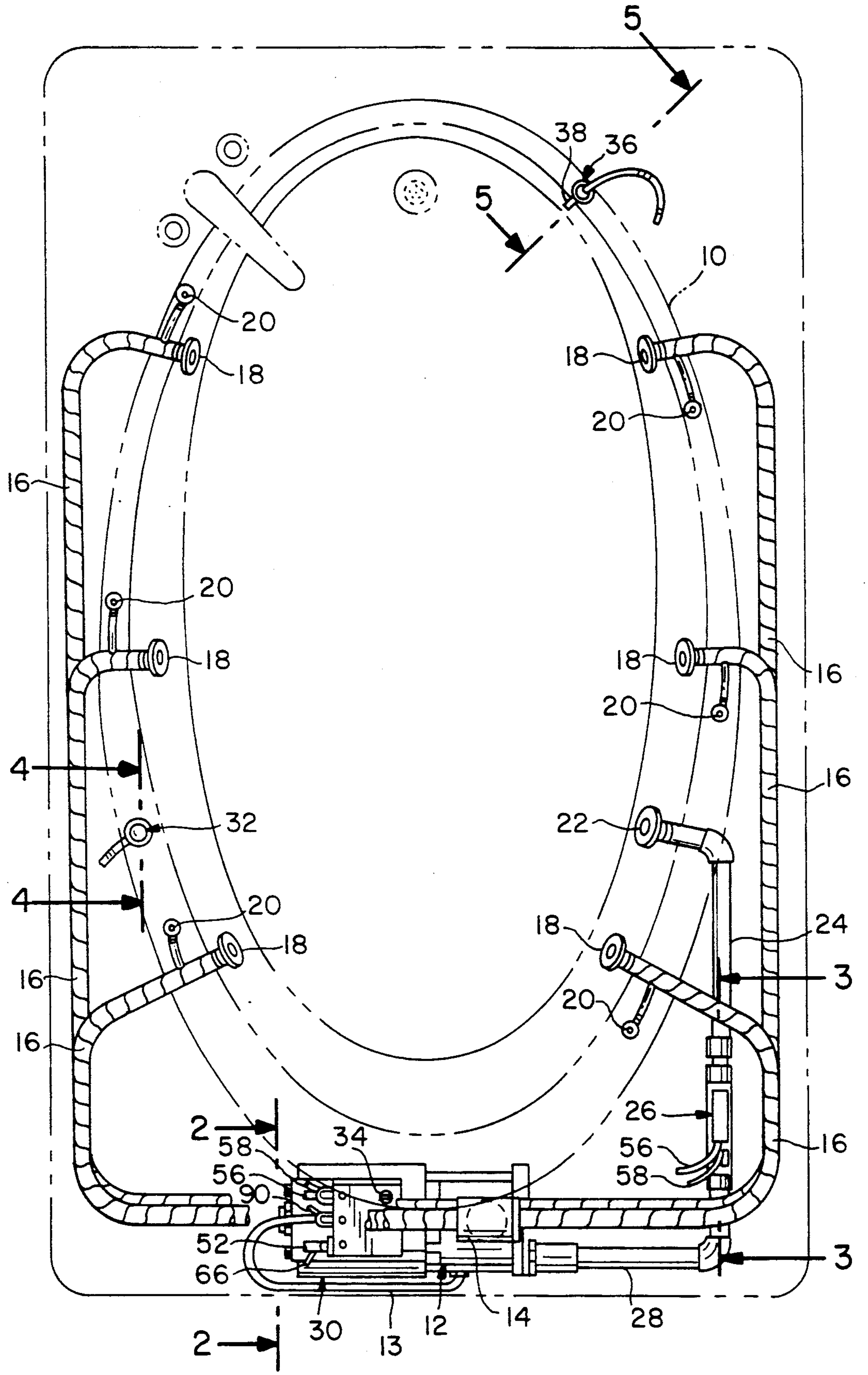
FIG. 1 is a top view of the hydro-massage tub control system according to the invention.

A hydro-massage tub control system is shown generally in FIG. 1 with tub 10 being shown in phantom for purposes of clarity. The hydro-massage tub control system is comprised of a pump 12 for delivering water through a flow disbursement manifold 14 to flexible pipes 16 for delivery to a plurality of jets 18 which create turbulence in the water in tub 10. The turbulence created in tub 10 provides a therapeutic massaging action. The massaging action can be enhanced by the addition of air through air vents 20 connected to the jet heads 18. Air vents 20 are often each separately adjustable to regulate the amount of air provided to each of the jets.

The water in tub 10 is drawn into pump 12 through suction inlet 22 and pipe 24. An in-line heater 26 heats the water being drawn into pump 12 as it flows through the heater and pipe 28. Heater 26 is controlled by a heater control circuit in control box 30, as will be described in greater detail hereinafter.

The system also includes an activating device 32 mechanically isolated from the electrical components and the electrical wiring for activating the control system. A timer in control box 30 times the period of operation of the pump as will be described in greater detail hereinafter. Also included in control box 30 is an external temperature adjustment 34 for presetting the maximum water temperature over a temperature range of about 15° F. delivered from pump 12.

The system also includes a unique water level sensing safety system 36 attached to tub 10 at 38, slightly above the level of jets 18. Water level sensing safety system 36 inactivates the hydro-massage system if the water level is below the inlet 38, as will be described in greater detail hereinafter.

Figure 2:
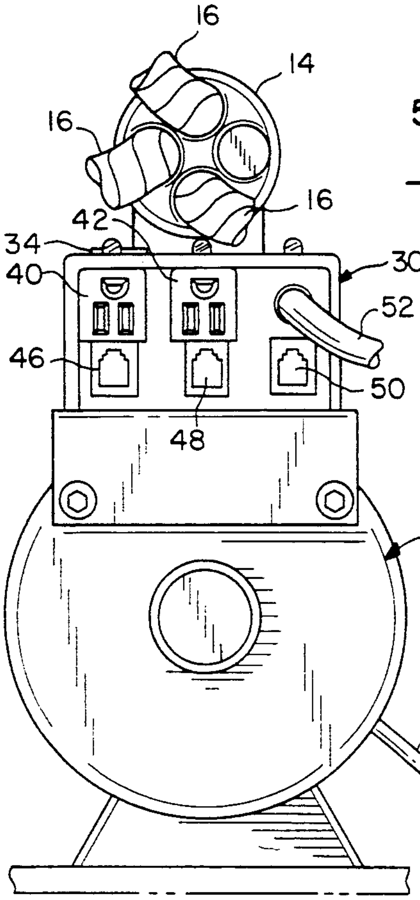
FIG. 2 is an end view of the pump mounted control system taken at 2—2 of FIG. 1.

FIG. 2 is a view taken at 2—2 of FIG. 1 illustrating the mounting of the control box 30. Control box 30 is mounted on top of pump motor 12 for controlling operation of the pump, heater, water level sensing safety system, as well as the operation of activating device 32 and to use the pump housing as a heat sink for power components. The control box 30 also provides power to the heater through socket 40 and to pump 12 through socket 42 and cord 13. The sockets 40 and 42 are shown with the respective components unplugged for purposes of clarity.

The heater temperature and control circuit, the on-off switch, and the level sensor are connected to the control circuits in control box 30 through modular plugs (not shown) which connect to modular sockets 46, 48 and 50 respectively. Input power is provided to the control circuit through cord 52 connected to any convenient AC power supply, controlled by a wall switch. The use of plugs 40, 42 and modular sockets 46, 48 and 50 allow each component of the system to be easily removed for repair or replacement. They also allow easy assembly and installation.

Figure 3:
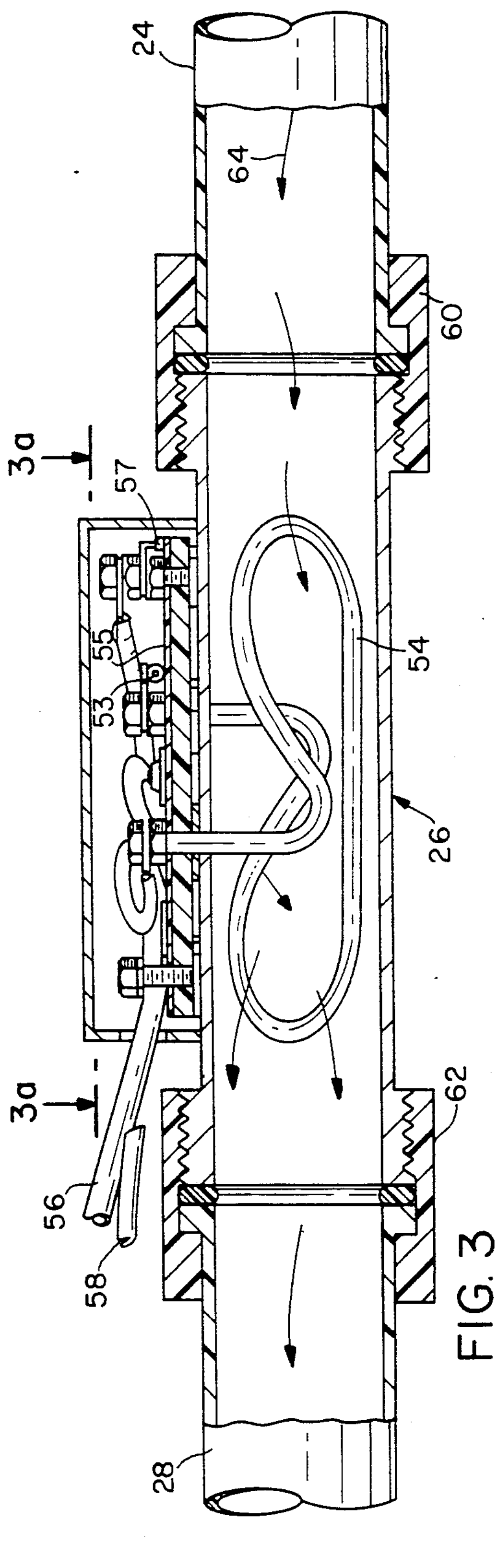
FIG. 3 is a sectional view taken at 3—3 of FIG. 1.
Figure 3A:
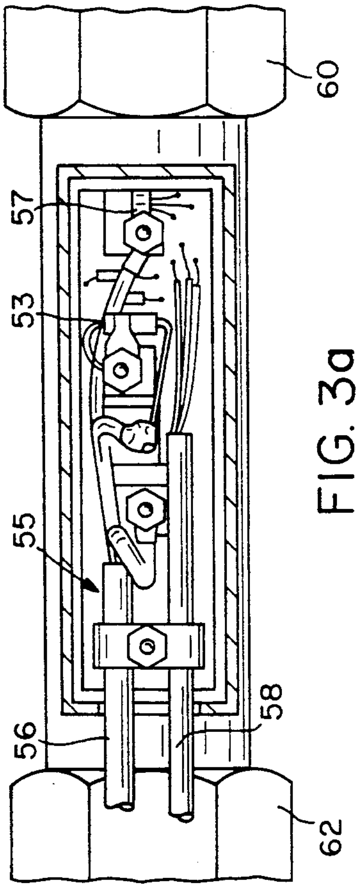
FIG. 3*a* is a sectional view taken at 3*a*—3*a* of FIG. 3.

The heating system is shown in the sectional view of FIG. 3, and is comprised of a compact heater 26 connected to a temperature sensing heater interface board 55, as will be described in greater detail hereinafter. Power to heater element 54 is supplied through cord 56 plugged into socket 40 on control box 30 which is protected by thermal fuse 53. Temperature sensor 57 and heater interface board 55 is monitored through signal cable 58 connected to modular plug 46 on control box 30. The entire heater assembly 26 is attached to suction line 24 and 28 by couplings 60 and 62. Water, indicated by arrows 64, flows through conduit 24, heater assembly 26 and conduit 28 to the pump, to be kept at a preselected operating temperature determined by adjustment of temperature control 34. This sets the maximum temperature of water in tub 10.

The heating system 26 is uniquely constructed so that heater 54 is approximately about one-half the size of heater elements presently used. The reduction in the size of the heater is made possible by removing the heater controls to control box 30 with only the heat sensor and thermal fuse being on heater assembly board 55. The much smaller construction of heater 54 permits use of a housing having the same diameter as pipes 24 and 28 on either side of standard couplings 60 and 62 which allow easy removal and replacement. A further advantage of this construction is that water retention, a problem frequently encountered with prior systems is eliminated because a smaller, shorter housing 27 can be used. The smaller diameter heater housing eliminates any traps which might be formed by a housing larger than the diameter of the water pipe and effectively eliminates water retention.

Figure 4:
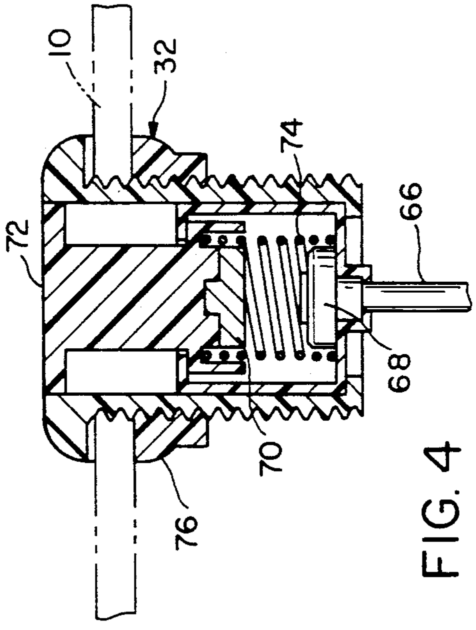
FIG. 4 is a sectional view of the activating device for use in the invention taken at 4—4 of FIG. 1.

A unique activating device 32 is illustrated in FIG. 4. The activating device is connected to the system through signal cord 66 attached by a modular plug (not shown) to modular socket 48 in control box 30. Activating device 32 is comprised of a Hall effect solid-state switch 68 activated by magnet 70 on plunger 72 mounted in housing 76 on the rim of tub 10. The system is turned on by pressing button 72 against the force of spring 74 bringing magnet 70 in close proximity to Hall effect switch 68 to transmit a signal through signal transmitting cord 66 to activate pump 12 and heater 26 through a switching and timing circuit. Heater 26 will not operate unless pump 12 is also in operation. The pump 12 will remain on for a period set by a timer, as will be described hereinafter. Activating device 32 is mounted in housing 76 securely mounted in the rim of tub 10, as illustrated in FIG. 1. The operation of activating device 32 is completely isolated from any electrical components and wires from the person using the hydro-massage tub. Alternatively, switch 68 may be a momentary switch, proximity switch, optical switch or mechanical switch.

The switch on timer circuit 104 combined with activating device 32 may be configured to be a three-way sequential transmitting device. The sequential operation of plunger 72 activates the pump, then the pump and heater and finally turns the system off (in a on/on/off operation). Thus, modified activation device 32 in conjunction with a heater control circuit, to be described hereinafter, provides a three-way mode of operation.

Figure 5:
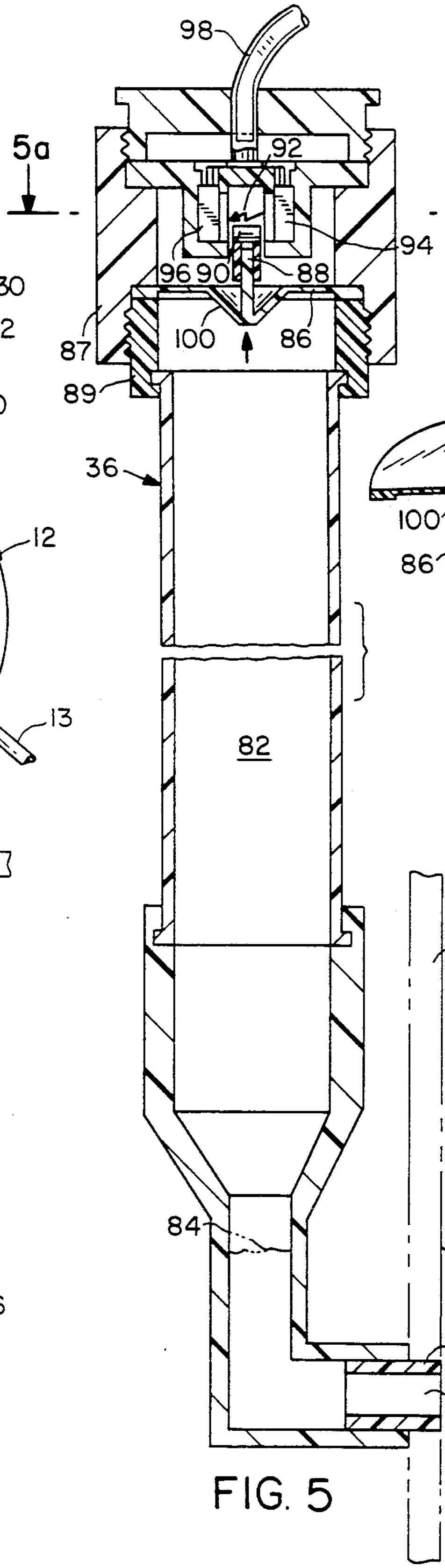
FIG. 5 is a sectional view of a water level sensing safety system taken at 5—5 of FIG. 1.
Figure 5B:
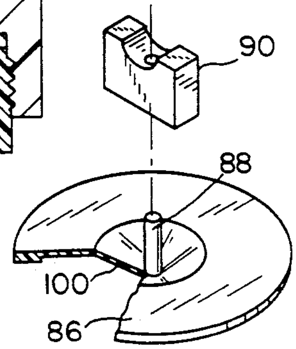
Figure 5A:
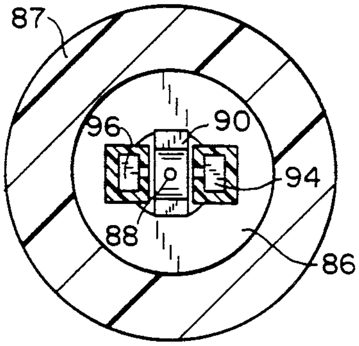

To prevent operation of the system in the event that the water level is low in tub 10, a water level sensing safety system 36, shown in FIG. 5, is provided. Water level sensing safety system 36 is comprised of a closed tubular container connected to tub 10 by a through wall fitting 78 secured to the wall of the tub. Through wall fitting 78 provides an inlet 38 for water 80 to enter cavity 82 in the water level sensor. Inlet 38 should be at a level which is higher than the jets, to assure that the level of water 80 covers the jets completely. This prevents water from accidently being splattered out of the tub should the system be turned on when the water level is below the jets. Water level sensor safety system 36 provides an air column inside cavity 82. Since water level sensor 36 is completely sealed, the air column in cavity 82 will be compressed as water level 84 inside the water level sensor rises. Thus, the water level must be above inlet 38 to cause an increase in pressure sufficient to allow the hydro-massage system to operate.

Water level sensing safety system includes diaphragm 86 clamped by head 87 on neck 89 having a small post 88 receiving a flag or barrier 90 moved up or down with diaphragm 86. Barrier 90 is positioned to occlude light beam 92 from light emitting diode 94 impinging on photo cell 96. As long as barrier 90 remains between light emitting diode 94 and photo cell 96 the system can continue to operate because no reset signal is generated. This can only occur when water level 84 in the water level sensing safety system is sufficient to increase the pressure in the air column to deform or expand diaphragm 86. Should the water level fall below inlet 38, the air column pressure will drop causing diaphragm 86 to retract removing barrier 90 from between light sensing diode 94 and photo cell 96. Beam 92 may now impinge on photo cell 96 transmitting a signal through signal transmitting cord 98 to a modular plug (not shown) connected to modular socket 50 at the control box 30 to reset a switching circuit shutting down the system. The system will remain inoperative as long as the level of water 80 is too low, preferably below inlet 38.

Water level sensor 36 has a unique diaphragm 86, shown in greater detail in FIG. 5(*b*). Diaphragm 86 has a central conical shaped thin membrane 100 supporting post 88. Thin conical membrane 100 provides a positive displacement of post 88 and barrier 90 mounted on the post. Any increase in pressure of the air column in cavity 82 causes membrane 100 to bulge upward and then snap into a deformed, expanded position with barrier 90 interrupting the beam 92 from light emitting diode 94. A reduction in the level of water 80 in tub 10 below inlet 38 will reduce the pressure in air column in cavity 82 causing a reversal of membrane 100. The diaphragm will begin to retract as pressure drops and then membrane 100 will snap back retracting post 88 and barrier 90 from a position interrupting the beam from light emitting diode 94. Water level sensor safety system 36 provides a positive acting system which almost instantaneously deactivates the system should the water level fall below a safe margin.

Figure 6:
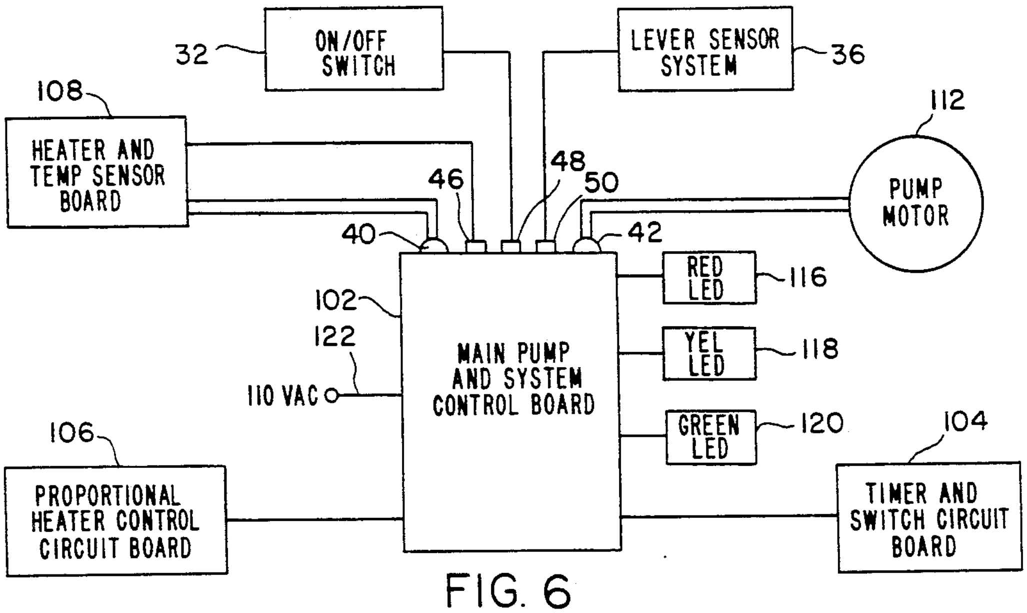
FIG. 6 is a block diagram of the hydro-massage tub control system.

The electronics of the system are shown in the block diagram of FIG. 6. The main control box 30 includes a main control board 102, switching and timer circuit board 104 and a proportional heater control circuit board 106. Heater and pump motor are connected directly to a power supply through main system control board through plugs 40 and 42. Temperature sensing board 108 in the heat and temperature sensor assembly is connected to the main pump and system control board through modular plug 42. Activating device 72 and water level sensor 36 are connected to modular sockets 50 and 48 respectively. The main system control board includes indicating lamps or light emitting diodes (LED's) 116, 118 and 120, which provide an indication of system operation and diagnostics.

Green light emitting diode 120 lights whenever the system is enabled. Yellow LED 118 lights when heater 54 is on. Yellow LED 118 blinks on and off indicating the proportional power being applied to the heater. The longer the yellow LED is on, the more power is being applied to the heater. Red LED 116 provides system diagnostics by indicating if the system is correctly installed and connected. An additional red LED (not shown) indicates the failure of a thermal fuse 53 connected to detect overheating of heater 54, as will be described in greater detail hereinafter. As can be seen from the block diagrams of FIG. 6, each modular component of the system is easily connected and disconnected for repair or replacement.

Figure 7A:
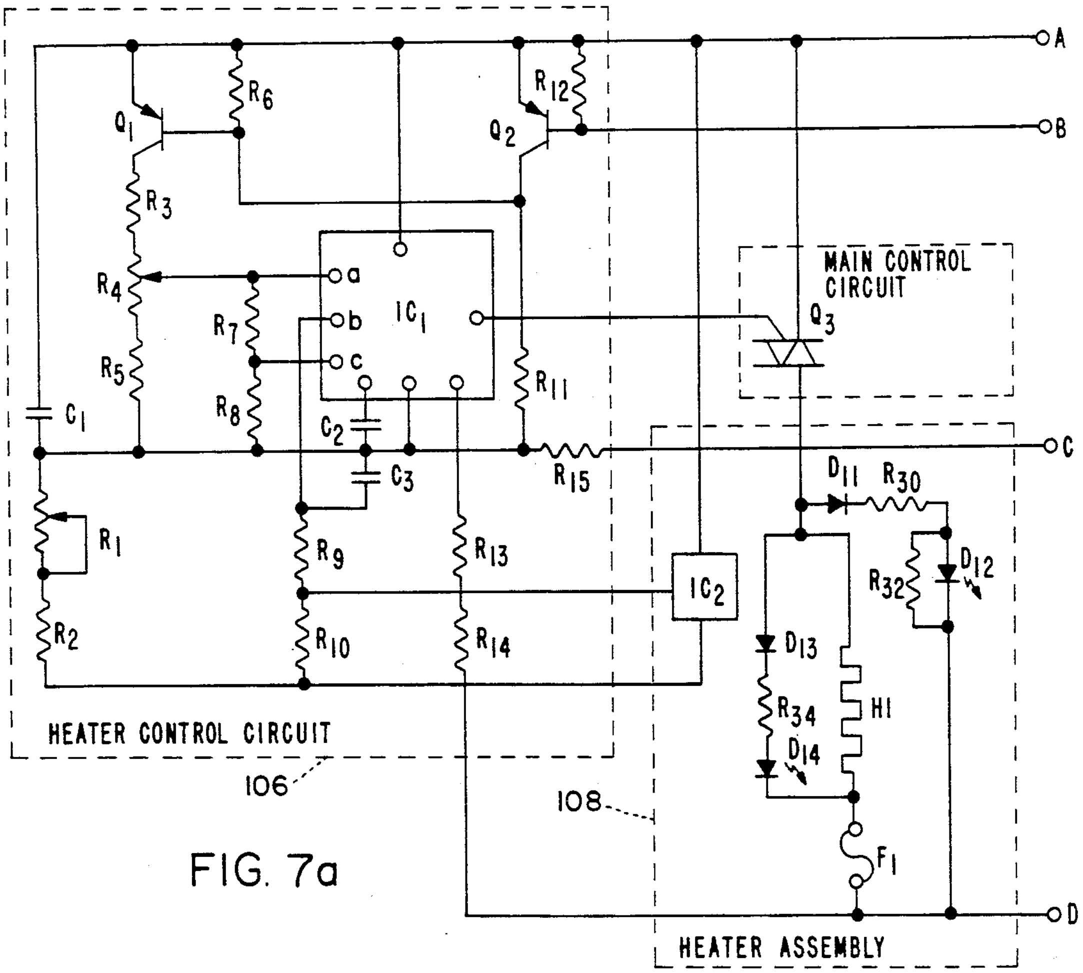
FIGS. 7(*a*) and 7(*b*) are a schematic diagram of the hydro-massage tub control system.
Figure 7B:
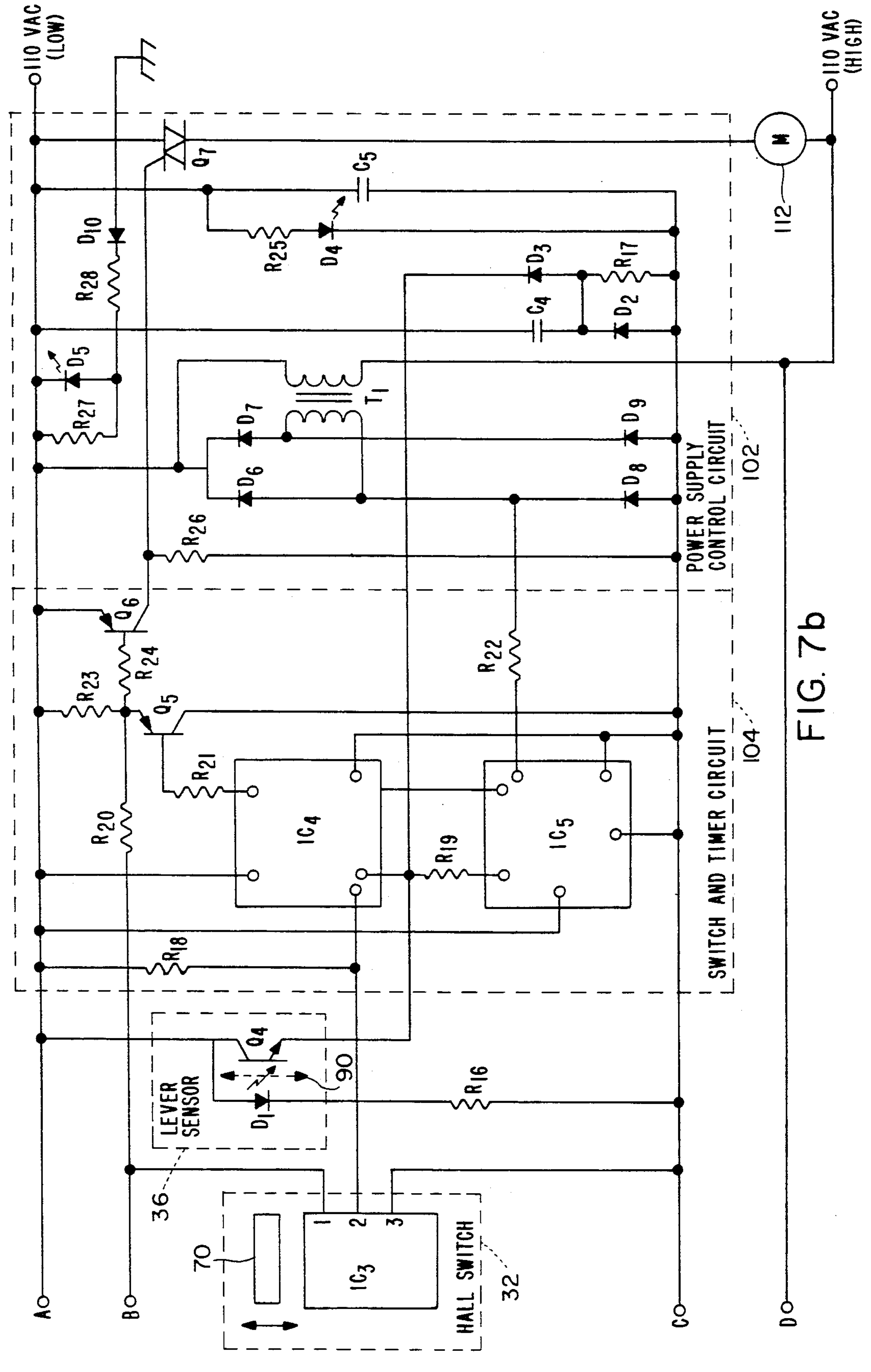

The electrical operations of the system can be seen by reference to schematic diagram of FIG. 7(*a*) and 7(*b*), where the reference numbers indicate the corresponding circuits in the block diagram of FIG. 6. Main control circuit board 102 is shown in FIG. 7(*b*). Power is supplied to the pump and heater through triacs $Q_7$ and $Q_3$ (FIG. 7(*a*)), respectively. Additionally, operation of motor 112 is controlled by an input from switch 32 to timer circuit 104 and triac $Q_7$ to time the length of operation of the motor. The upper terminal is the 110 volt AC low level connection, with the lower terminal being the 110 AC high level connection. The middle terminal connected to diode $D_2$ is chassis ground for the system.

The main control and power supply circuit supplies DC power of approximately 12 volts from transformer $T_1$, through the bridge rectifier comprised of diodes $D_6$ through $D_9$ to all solid-state circuits. It also supplies the component voltages and interconnections to timer board and temperature control board, as well as gate power to the triacs that power the motor and heater.

The system is turned on by operating activating device 32, comprised of Hall effect switch $IC_3$ activated by moving magnet 70 toward or away from the Hall effect switch. This sends a signal to activate flip-flop $IC_4$ and timer $IC_5$ to turn on triac $Q_7$ through $Q_5$ and $Q_6$, which supplies power to the pump motor. Timer $IC_5$ is set to a pre-selected cycle by the circuit configuration, preferably 9 to 10 minutes. $IC_4$ and its related circuit acts as an on-off switch for pump motor 112, while $IC_5$ controls the period of operation of the system.

Activating switch 32 a first time transmits a signal to set flip-flop $IC_4$ high, turning off transistor $Q_5$ and $Q_6$, which turns on triac $Q_7$ via current flow through resistor $R_{26}$. This activates pump 112 and simultaneously enables power controller $IC_1$. A second activation of switch 110 sends a signal to reset flip-flop $IC_4$ turning on $Q_5$ and $Q_6$ to divert current of resistor $R_{26}$ from triac $Q_7$ turning it off and stopping the pump. Triac $Q_7$ is simply an AC switch to apply AC power to pump motor 112.

Figure 8:
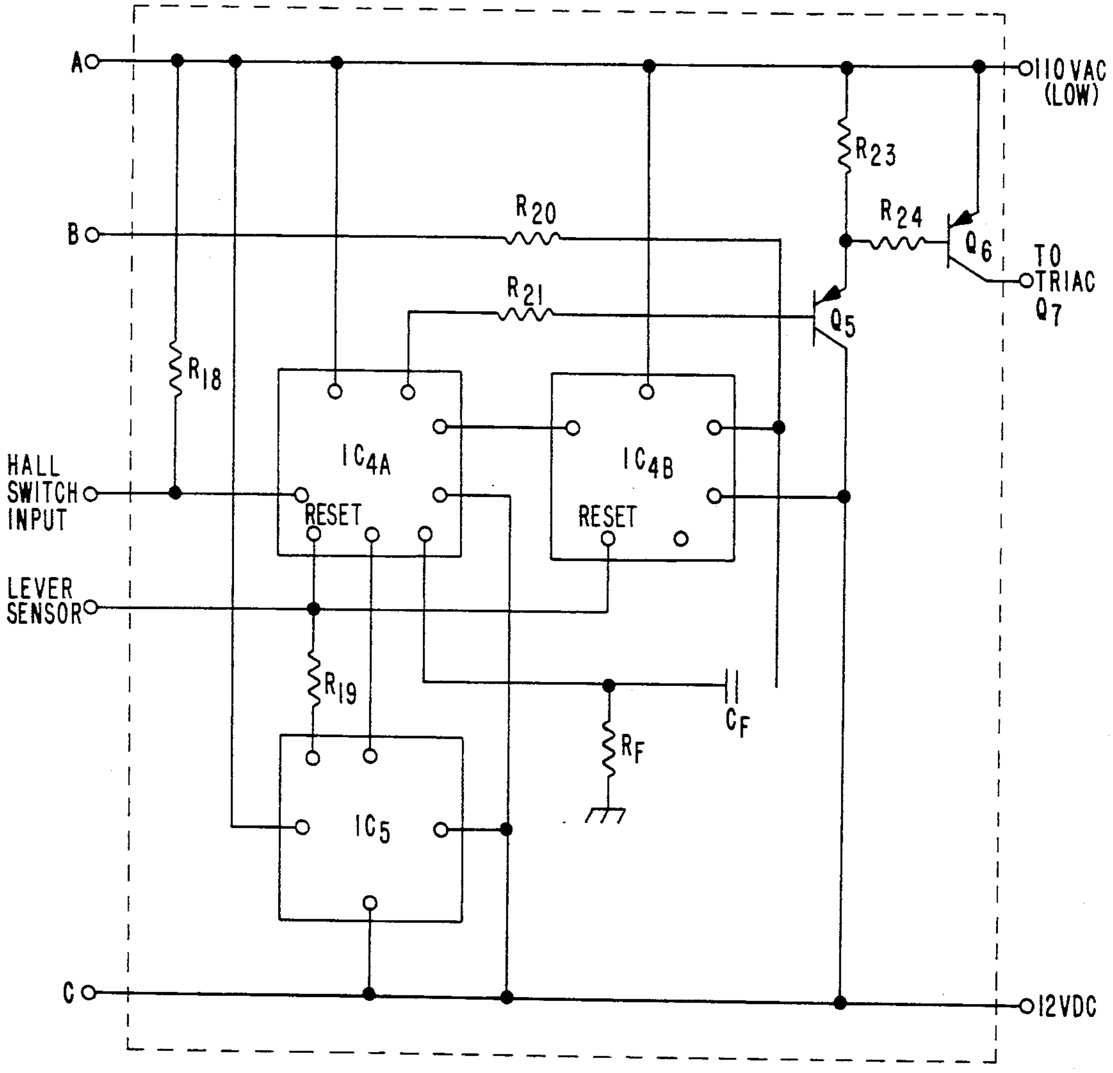
FIG. 8 is a partial schematic diagram showing a switching circuit modification.

An optional but preferred arrangement of the system is to provide a three way on/on/off selection with the activating device 32 (i.e. Hall effect switch). The three way operation is achieved by modifying the connection of integrated circuit $IC_4$ a 4013 integrated circuit as a dual flip-flop connected in tandem, shown in the partial schematic of FIG. 8 as $IC_{4A}$ and $IC_{4B}$ with the modification of connections to $IC_4$. The first operation of activating switch 32 sets $IC_{4A}$. A second operation of switch 32 resets $IC_{4A}$, sets $IC_{4B}$ then sets $IC_{4A}$ again through feedback circuit of $R_F$, $C_F$. This enables (i.e. turns on) both the pump and heater. A third operation of switch 32 resets $IC_{4A}$ and $IC_{4B}$ shutting off the system. The first activation of switch 32 transmits a signal to flip-flop $IC_4$ turning on the pump. A second activation of switch 32 activates heater 54 presuming that the temperature is sufficiently low that power will be enabled to power controller $IC_1$. A third activation of switch 32 sends a reset signal to flip flop $IC_{4A}$ and $IC_{4B}$ to turn off the system completely.

Transistors $Q_1$ and $Q_2$ provide a switch to slave the operation of the heater control circuit to operation of pump 112. These transistors are slaved to operation of triac $Q_7$ which, when on, enables power controller $IC_1$.

The system has a power up reset system for initial connection of 110 AC voltage, or whenever there is a loss of power. At initial hookup system power is applied through a circuit comprised of diodes $D_2$ and $D_3$, resistors $R_{17}$ and capacitor $C_4$ to the reset pin of flip-flop $IC_4$ resetting the system. Any loss of power will also apply a reset to the system when power returns. When timer $IC_5$ counts down to zero from its preset time limit a signal is applied to the reset pin of flip-flop $IC_4$, which in turn resets itself.

Additionally, at low water level or when there is no water in the tub a beam from light emitting diode $D_1$ impinges on photocell $Q_4$ applying a "hard" reset to flip-flop $IC_4$ which will reset both the flip-flop and the timer disabling or preventing operation of the system. A constant reset signal will remain on the reset pin of $IC_4$ whenever light from light emitting diode $D_1$ impinges on photocell $Q_4$ preventing operation of the system when water is below a certain level or there is no water in the tub.

Water level sensor 36 is connected to flip-flop $IC_4$ and timer $IC_5$ to act as a "supervisor" to determine whether the system can operate. If the water level is sufficient such that barrier 90 blocks beam from LED $D_1$, then the system can operate. However, if the water level is too low and the beam from LED $D_1$ strikes photo cell $Q_4$, then the water level sensor will apply a hard reset to flip-flop $IC_4$, the pump on-off switching circuit.

Thus, there are three resets for the system. One is when a second signal is sent from activating switch 32, a second is when timer $IC_4$ count down to zero sending a reset and a third is transmitted from the level sensor whenever the water level is low or there is no water in the tub.

A signal from activating switch 32 sets flip-flop $IC_4$ which removes the reset signal sent to timer $IC_5$ causing it to begin to count down from the preset time. Timer $IC_5$ is a 4541 timer connected to control the running time of pump 112 and heater to comply with safety regulations. A time period of approximately 9 to 10 minutes is selected by the circuit configuration.

Timer $IC_5$ times its operation by counting cycles from the AC line supplied through resistor $R_{22}$. Time is set in timer $IC_5$ by pin connections. The timer uses a countdown scheme of the AC cycles for long term stability, reliability and accuracy.

The heater control circuit, shown in FIG. 7(*a*), is slaved to the motor switch circuit by transistors $Q_1$ and $Q_1$ and $Q_2$ to prevent operation of the heater whenever the pump is off. Main control and power supply circuit 102 also includes triac $Q_3$ acting as an AC switch controlled by a proportional control triac driver $IC_1$. Proportional power controller triac drive integrated circuit $IC_1$ is connected to temperature sensor $IC_2$ in heater assembly 108. Any rise and fall of the temperature is applied to proportional control driver $IC_1$ to control the power applied to heater $H_1$ through triac $Q_3$. Thus, the operation of heater $H_1$ is proportionally controlled to maintain the temperature of water flowing through heater 26 at a nearly constant temperature varying only $\pm 1°$ to 2° F., or better.

Thermal fuse $F_1$ in heater assembly 108 is connected in series with heater $H_1$ and burns out if the temperature in heater $H_1$ exceedes a pre-determined level. Thermal fuse $F_1$ is preferably selected to prevent the temperature of heater $H_1$ from exceeding approximately 150 degrees fahrenheit, but could be higher.

Potentiometer $R_4$ sets a temperature range of about 15° F. for proportional control drive chip $IC_1$. Potentiometer $R_1$ sets the maximum upper limit of the temperature range for the water flowing through heater 26. Preferably this temperature is in the range of 104 degrees, the maximum tolerable temperature for most bathers.

Proportional controller $IC_1$ is a motorola UAA1016B integrated circuit, more specifically described as a proportional band temperature control. It puts out pulses to turn on triac $Q_3$ to power heater $H_1$. Groups of pulses are output from proportional controller $IC_1$ proportional to inputs received from temperature sensor $IC_2$. The output from temperature sensor $IC_2$ is a voltage level proportional to the temperature and the set point voltage determined by potentiometer $R_4$ in $IC_1$. The temperature sensor inputs are applied to sensing input pins "a" and "b" of $IC_1$. When the water in the tub is cold or below the set point voltage (i.e. temperature) determined by potentiometer $R_4$, a continuous stream of pulses from $IC_1$ allows triac $Q_3$ to fire every cycle keeping heater $H_1$ continuously on. When the temperature reaches the control band, the output from proportional controller $IC_1$ is a burst of pulses and then a pause. As the temperature increases through the proportional band, the bursts of pulses shorten and each pause between bursts lengthens, until the temperature reaches the set point voltage (temperature) and then shuts off. This is indicated by light emitting diode $D_{14}$ blinking on for shorter periods reflecting the shorter bursts of pulses from $IC_1$ as temperature approaches the set point.

Power controller $IC_1$ has a control band which is set to control the temperature within a range of plus or minus 1 to 2 degrees fahrenheit (F.), or better. The difference between the low level and high level of the control band is set by the voltage at pin "c" of $IC_1$. Maximum power is applied to the heater until it reaches the lower level of the power controller band, and the controller then begins to cut down the bursts of pulses and consequently the power to the heater $H_1$. This is in contrast to the usual full on or full off control circuit presently used.

The duty cycle of triac $Q_3$ and heater $H_1$ is controlled by the pulses from power controller $IC_1$. This can be visually perceived by yellow LED $D_{12}$ (118 in FIG. 6) blinking on and off. The yellow LED blinks on for a longer period at the lower end of the control band and blinks on for shorter periods indicating lower power, as the temperature approaches the set point or upper end of the control band. At the set point the heater is turned off minimizing overshoot of the set temperature. The proportional controller controls the temperature, preferably within a plus or minus one degree level. This maximum is adjustably set by potentiometer $R_4$ and may be approximately the maximum tolerable temperature of about 104 degrees fahrenheit.

Temperature sensor $IC_2$ puts out approximately 10 millivolts per degree fahrenheit, which is applied through $R_9$ and $R_{10}$ to pin "b" of power control $IC_1$. Power controller $IC_1$ provides 100% power to heater $H_1$ until it reaches the lower level of the control band, about one degree below the set point, and then gradually reduces power until it's at zero at the upper level of the control band.

Connected across heater $H_1$ and thermal fuse $F_1$ is an indicating circuit to show the on cycle of the heater and to indicate whenever fuse $F_1$ should fail. If heater $H_1$ overheats and thermal fuse $F_1$ fails, red LED $D_{14}$ goes off. Red LED $D_{14}$ is not shown in the mechanical drawings, but could be mounted in any convenient place on heater board 55.

Yellow LED $D_{12}$ is illuminated whenever power is applied to heater $H_1$ through triac $Q_3$. The yellow LED will be on constantly until the temperature level reaches the lower level of power control band, or about one degree below the minimum set point. The yellow lamp will then begin to blink on and off indicating the duty cycle of the heater. The on cycle of the yellow lamp will indicate long on periods when the temperature is near the lower level of the power control band and then will blink for shorter periods as the power approaches the upper level of the power controller band where the power to the heater approaches 0%. Thus, the power is gradually reduced from 100% at the lower level of the power control band through about 50% at the middle portion of the power control band to 0% at the upper level of the power control band minimizing overshoot of the temperature and maintaining constant accurate temperature within ±1° to 2° F., or better.

Thermal fuse $F_1$ is selected to provide a maximum temperature in the range of approximately 150° F. at which point it will fail shutting down the heater.

Potentiometer $R_1$ sets the maximum upper limit of the temperature range over which the set point is controlled by potentiometer $R_4$. Potentiometer $R_1$ is an internal adjustment to preset a 15° F. temperature range at an upper limit of 104 degrees. Potentiometer $R_4$ allows an adjustment of the set point temperature within the 15° F. externally from approximately 90 range up to the maximum of 104 degrees.

When wall switch (not shown) is turned on, green LED $D_4$ is turned on and remains on as long as the system remains activated. When the system is no longer being used and the wall switch is turned off, it removes the power to the system and the green LED $D_4$ is extinguished.

Red LED $D_5$ is a diagnostic indicator to be certain that the lines are properly connected. If the high-low lines should be reversed when installing the circuit the red LED $D_5$ will illuminate indicating that the power lines have been reversed. They can then be properly connected. The system will run with the lines reversed but is more subject to interference from line spikes.

In operation the system is activated after filling tub 10 by pressing activating device 32. This sends a signal to activate flip-flop $IC_4$ and timer $IC_5$, turning on motor 112 to start circulating water through heater 26 to flexible pipes 16 and jets 18. As the water flows through heater 26 temperature sensor $IC_2$ sends a signal to proportional control driver $IC_1$ to allow power to flow through triac $Q_3$ to heater $H_1$. Of course, the system will remain inoperative unless the water level in tub 10 is first sufficient to interupt the light beam from LED 94 in water level sensor 36. The system will continuously circulate water through pump 12 and flow disbursement manifold 14 for a period of time determined by timer $IC_5$. When the period of time set, usually in the range of 9 to 10 minutes, expires timer $IC_5$ resets flip-flop $IC_4$ and itself shutting off pump motor 112 and deactivating heater 26. The system can be restarted by again operating activating device 32, if desired.

The system disclosed and described provides a unique hydro-massage tub control system for circulating water to a hydro-massage tub which has improved efficiency, stability, accuracy and reliability. The system also includes a unique water level sensing safety system and a proportional temperature control for highest efficiency and reliability. The system is entirely solid-state for high reliability and the electrical circuits are isolated for maximum safety.

This invention is not to be limited by the embodiment shown in the drawings and described in the description which is given by way of example and not of limitation, but only in accordance with the scope of the appended claims.

What is claimed is:

1. A control system for a hydro-massage tub comprising:

pump means for pumping water from said tub back to a plurality of jets in said tub;

heating means for heating said water as it circulates through said pump means;

proportional temperature control means for applying proportional power to said heating means to maintain said water near a constant preselected temperature;

said proportional temperature control means comprising; a solid-state AC power switch, and a solid state temperature control integrated circuit responding to changes in water temperature for activating said power switch to apply power from said power supply to said heater means proportional to a change in water temperature;

activating means for activating said control system;

level sensing means for sensing the level of water in said tub and interrupting operation of said control system when the water falls below a preselected level;

said level sensing means including a closed container having an inlet at one end; said closed container being mounted on said tub with said inlet positioned to receive water filling said tub, said closed container being mounted to form an air column, a diaphragm mounted in said container above said air column, switch signalling means in said container mounted for operation by movement of said diaphragm, so that water entering said inlet causes an increase in pressure in said air column expanding said diaphragm to operate said switch signalling means;

said switch signalling means comprising a light emitting diode, a photocell mounted to receive light from said light emitting diode, and beam interrupting means on said diaphragm for interrupting the path of said light beam from said light emitting diode when said diaphragm expands;

power supply means for supplying power to said control system, said power supply means including means for preventing operation of said heater means without operation of said pump;

whereby water is heated and circulated through jets in said tub to create a turbulent massaging action.

2. The system according to claim 1 in which said temperature control means includes means for adjusting the temperature range and maximum temperature.

3. The system according to claim 2 in which said temperature control means is adjusted to control the water temperature in a range of approximately 15° F.

4. The system according to claim 1 in which said heater means includes; a heater element; a thermal fuse in series with said heating element; and solid state temperature sensing means sensing the water temperature; said solid state temperature sensing means being connected to said solid state temperature control integrated circuit so that continuous reading of water temperature is provided.

5. The system according to claim 4 including indicating means for indicating failure of said thermal fuse, said indicating means comprising a red light emitting diode.

6. The system according to claim 4 including return pipe for returning water from said tub to said pump; said heater means being mounted in a section of said pipe.

7. The system according to claim 6 wherein said section of said pipe is connected to said return pipe with standard couplings; said section of pipe being the same diameter as said return pipe, whereby retention of water in said heater means is prevented.

8. The system according to claim 1 in which said beam interrupting means comprises; a post on the center of said diaphragm; and a barrier on said post; said barrier interrupting said light beam when said diaphragm expands.

9. The system according to claim 8 in which said diaphragm has a thin center portion which deflects from a first position to a second position when said diaphragm expands a predetermined amount, thereby providing a positive quick acting element to instantly interrupt said light beam or retract away from said light beam.

10. The system according to claim 9 in which said diaphragm has a thin conical shaped central membrane supporting said post; said conical membrane extending to one side of the plane of said membrane and being instantly deflected to the other side of the plane of said diaphragm when a predetermined pressure is applied to said diaphragm.

11. The system according to claim 1 in which said proportional temperature control comprises; an integrated circuit configured to control the water temperature within a range of ±2° F. of a set point.

12. The system according to claim 11 in which said integrated circuit is configured to control said temperature range to within ±1° F. of said set point.

13. The system according to claim 1 including slave circuit means connected to said power supply means to prevent operation of said heater means when power is not applied to said pump means; whereby said heater means may not operate unless said pump means is operating.

14. A control system for a hydro-massage tub comprising;

pump means for pumping water from said tub back to plurality of jets in said tub;

heating means for heating said water as it circulates through said pump means;

proportional temperature control means for applying proportional power to said heating means to maintain said water near a constant preselected temperature;

activating means for activating said control system;

said activating means including a solid state switch, mechanical means for activating said solid state switch, a flip-flop connected to activate said proportional temperature control means, timing means for timing operation of said control system, and reset signal applying means to apply a reset signal to said flip-flop to reset said control system when external power is applied;

level sensing means for sensing the level of water in said tub and interrupting operation of said control system when the water falls below a preselected level;

power supply means for supplying power to said control system, said power supply means including means for preventing operation of said heater means without operation of said pump;

whereby water is heated and circulated through jets in said tub to create a turbulent massaging action.

15. The system according to claim 14 in which said switch means is a Hall effect solid state switch and said mechanical means is a magnet mounted on a spring biased plunger for activating said Hall effect switch when said plunger is pressed.

16. The system according to claim 14 in which said flip-flop includes a reset, said flip-flop being connected to be reset when said solid state switch is operated a second time after activation of said control system.

17. The system according to claim 14 in which said flip-flop is reset when said timer reaches the end of its cycle simultaneously resetting said timer.

18. The system according to claim 14 in which said flip-flop is a dual flip-flop connected in tandem to provide multi-mode switching of pump on, pump and heater on and, system off.

19. A control system for a hydro-massage tub comprising;

pump means for pumping water from said tub back to plurality of jets in said tub;

heating means for heating said water as it circulates through said pump means;

proportional temperature control means for applying proportional power to said heating means to maintain said water near a constant preselected temperature;

activating means for activating said control system;

level sensing means for sensing the level of water in said tub and interrupting operation of said control system when the water falls below a preselected level;

power supply means for supplying power to said control system, said power supply means including means for preventing operation of said heater means without operation of said pump;

a control box mounted on said pump; said control box including a power control board, a switch and timing board, power cord means for connecting said control systems to 110 VAC input power, 110 VAC power sockets for plugging in said heater means and said pump, and modular telephone sockets for connecting said control box to said switch means, said heater means and said level sesning means for transmitting and receiving control signals so that said control system is modular in construction allowing removal and replacement of system modules for repair and replacement;

said control box including status indicator lamps comprising a green LED power on indicator, a yellow LED on-off duty cycle indicator, and a red LED wrong connection indicator for connection of power;

whereby said control system circulates and heats water circulated through jets in said tub to create a turbulent massaging action.

* * * * *